United States Patent [19]

Butler

[11] Patent Number: 5,025,687
[45] Date of Patent: Jun. 25, 1991

[54] INTERLOCKING DIE-TYPE TOOLING FOR STRIPPING INSULATED ELECTRICAL CONDUCTORS

[75] Inventor: John D. Butler, Germantown, Wis.

[73] Assignee: Mechtrix Corporation, Menomonee Falls, Wis.

[21] Appl. No.: 325,871

[22] Filed: Mar. 20, 1989

[51] Int. Cl.$^5$ .............................................. H02G 1/12
[52] U.S. Cl. ......................................... 81/9.51; 30/346
[58] Field of Search .................. 81/9.51, 9.4–9.44; 30/90.1, 346, 241; 83/693

[56] References Cited

U.S. PATENT DOCUMENTS

| 2,645,959 | 7/1953 | Fuchs et al. | 81/9.51 |
| 3,527,124 | 9/1970 | Ullman | 81/9.51 |
| 3,645,156 | 2/1972 | Mayer et al. | 81/9.51 X |
| 4,109,553 | 8/1978 | Drinkard, Jr. et al. | 81/9.51 |

Primary Examiner—D. S. Meislin
Attorney, Agent, or Firm—Fuller, Ryan & Hohenfeldt

[57] ABSTRACT

A pair of tooling assemblies cooperate to cut and strip insulation from an insulated electrical conductor. The first tooling assembly comprises a die type stripping blade and an insulation guide. The first stripping blade has a cutting edge located a predetermined distance from a guide face on the insulation guide. The second tooling assembly comprises a second die type stripping blade and an insulation stop. The second stripping blade has a cutting edge complementary with the first stripping blade cutting edge. The insulation stop has a stop face that is located a predetermined distance from the second stripping blade cutting edge. The two tooling assemblies are aligned in a coplanar plane and clamped in respective toolholders. When the toolholders are brought together, the stripping blade cutting edges cooperate to slice the insulation on the electrical conductor, and the insulation guide face and the insulation stop face cooperate to hold the insulation of the electrical conductor adjacent the slice in the insulation.

9 Claims, 3 Drawing Sheets

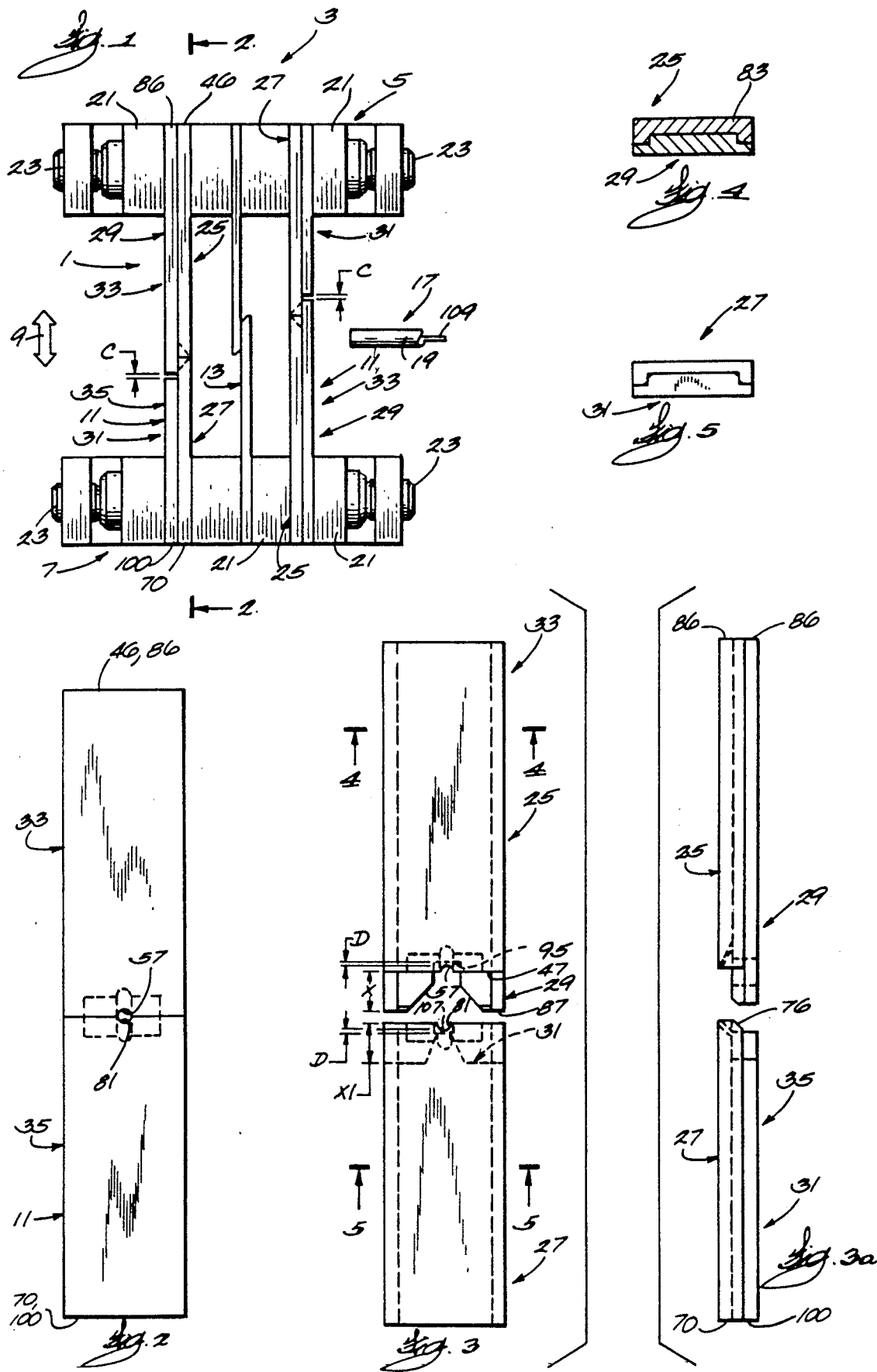

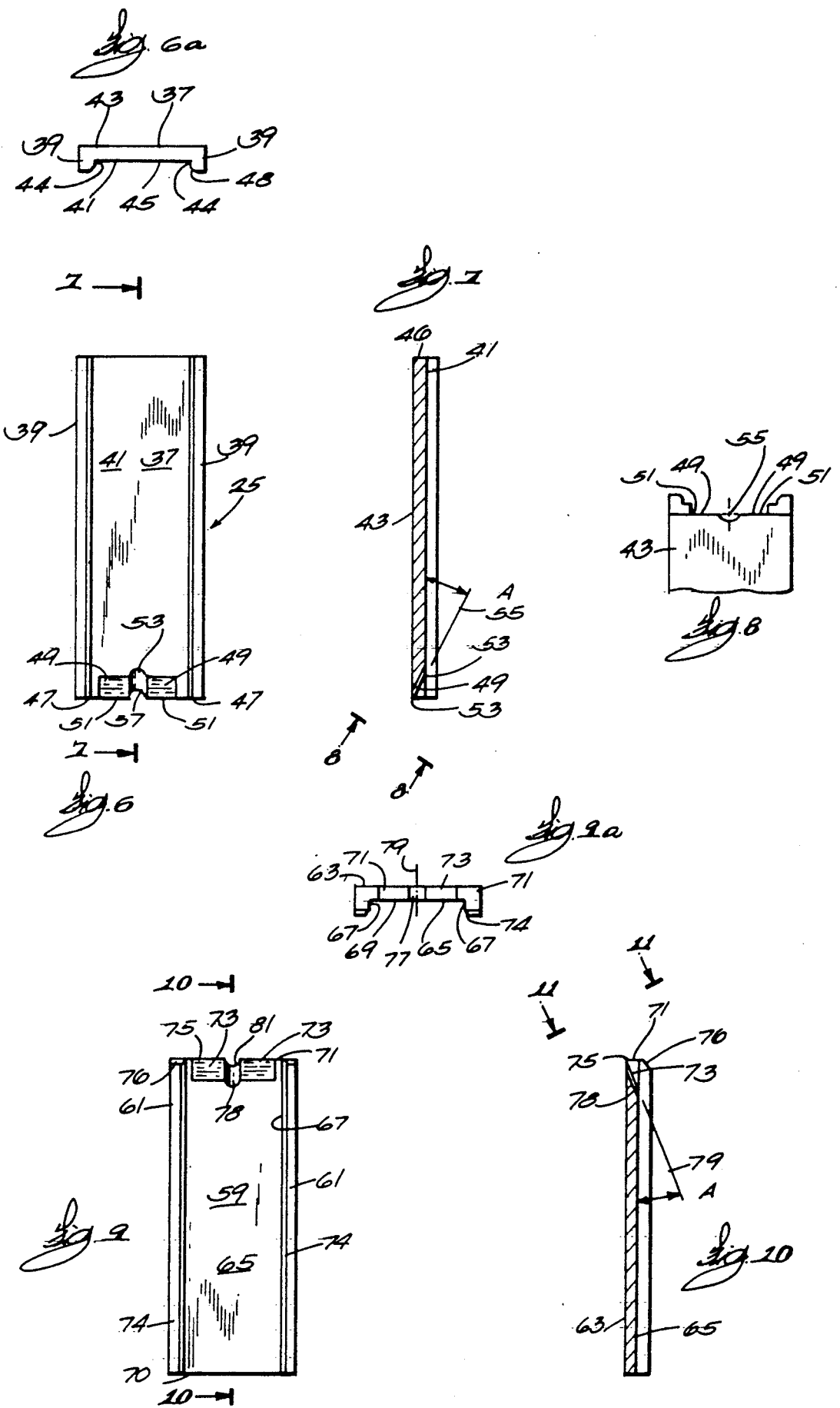

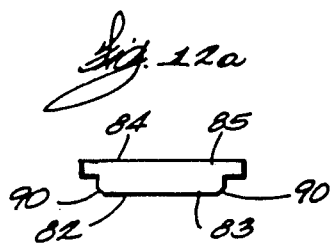
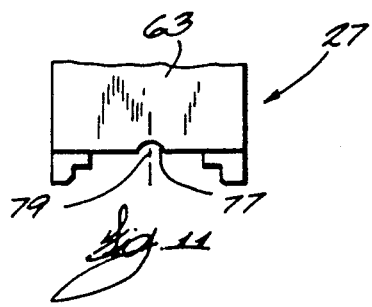
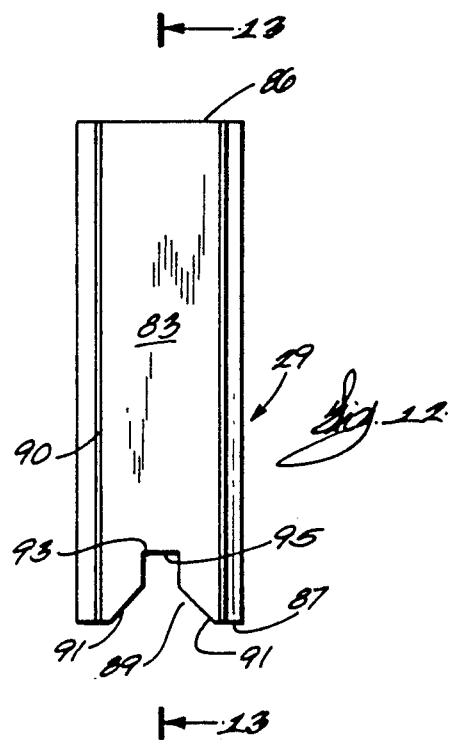
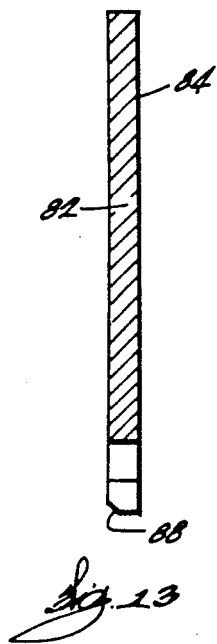
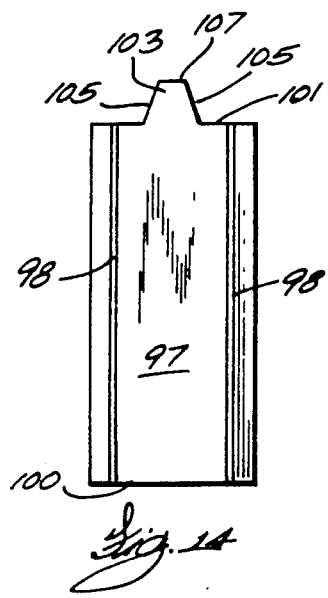
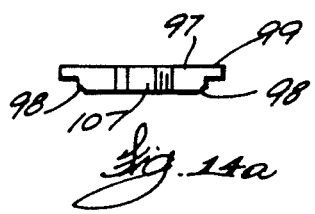
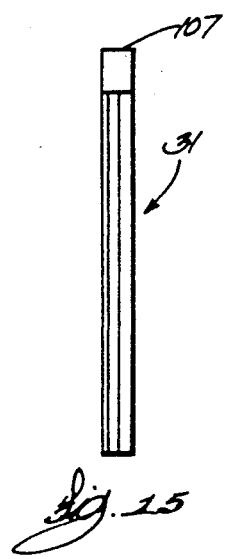

5,025,687

INTERLOCKING DIE-TYPE TOOLING FOR STRIPPING INSULATED ELECTRICAL CONDUCTORS

BACKGROUND OF THE INVENTION

1. Field of the Invention

This invention pertains to cutting devices, and more particularly to apparatus for precisely cutting and stripping insulation from insulated electrical conductors.

2. Description of the Prior Art

Industry utilizes two basic types of stripping blades for high production cutting and stripping of insulation from insulated electrical conductors, the "die" type and the "V" type. Although the size, shape, and performance characteristics of wire stripping blades vary greatly within the industry, almost all blades can be classified as either a die or a V type. As a general rule, blades that are designed to form one specific hole size, with no adjustment, are classified as die type. Blade geometries that can tolerate a range of conductor sizes generally fall into the V type category.

V type blades are named for the somewhat V-shaped opening at the working end of the blade. The sloping edges of the V type blade converge on a radius cutting edge that conforms to the periphery of the conductor to be stripped. In practice, a pair of V blades are used such that the V formed in the working ends of the two blades face each other. The blades are reciprocated opened and closed with the working radius cutting edges of the blades bypassing one another. In that way, the opposed respective V-shaped openings of the blades "gather in" and "close about" the insulated conductor.

The significant advantage of the bypassing V blades is that blades of a particular size may be opened or closed to conform to a larger or smaller conductor size. The flexibility of adjustment of the V type blades minimizes costly machine down time, because the blades need not necessarily be changed when a different wire size is to be processed. For that reason, V type blades are the most commonly used blades in the industry. An example of a V type blade is described in U.S. Pat. No. 4,577,405.

There are drawbacks to the V type blade. A significant disadvantage is that there is no guarantee that the blades will cut through the insulation to equal depths as the two V forms bypass each other and penetrate into the insulation. If one blade cutting edge is significantly duller than the opposed blade edge, it is possible that the dull blade will do very little cutting at all. In that case, there is a high probability that the sharper blade will cut too deeply into the insulation and possibly damage the inner conductor.

A second drawback to the traditional V type stripping blade is that the wide gathering V-shaped opening, by definition, prevents the pair of opposed stripping blades from defining the entire 360° of a circular stripping hole. That point was the basis of the invention described in U.S. Pat. No. 4,577,405. The blade described in that patent uses two angles in the V form. A wide angle is used to "gather in" the wire to be cut and stripped. A narrower angle adjacent the radius cutting edge performs the insulation cutting and stripping functions. The narrower blade angle, which is approximately 36° (compared with an angle of approximately 60° used with prior blades), enables a pair of blades to define approximately 80% of the circumference of a circle. Although a significant improvement over the prior blades, about 20% of the blade hole circumference remains non-circular.

Another disadvantage of a pair of bypassing V type blades is that the bypassing cutting edges intrinsically make slices that are not coincident. The "scissor action" of the bypassing blade cutting edges has a natural tendency to bend the insulation before the cutting edges actually penetrate the insulation. If there is a gap between the opposed blades when they close, the result will be two slices into the insulation 180° apart and spaced longitudinally along the wire by a distance equal to the gap between the two blades.

The adjustability feature of the V type blades may be considered to be a drawback. That is because such adjustability requires the machine operator to set the machine to stop the blade end travels. At initial set up, the operator generally does not have a clear indication as to what the hole size will be when the V blades are in the closed position.

It is therefore highly desirable to have a situation in which two blades close to form a very precise and completely circular cutting hole about the conductor, while also providing a means for limiting the depth of penetration of the blade cutting edges into the insulation. The die type blade accomplishes those objectives. The butting nature of the die type blade clearly defines the blade end travel as well as the cutting hole that is formed by the closed butted blades. Examples of prior die type blades include those described in U.S. Pat. Nos. 2,497,112; 2,844,056; 2,871,740; and 4,577,405. U.S. Pat. No. 4,577,405 describes a true die type blade that provides a clearance hole through a pair of opposed blades that is sized to suit the inner conductor as well as to provide clearance for the outer insulation. U.S. Pat. Nos. 2,844,056 and 2,871,740 show another advantage of the die type blade over the V type blade. That advantage is that the two opposed die type blades butt together and interlock with each other in order to assure perfect alignment of the respective blade hole forms.

Unfortunately, there are disadvantages to the die type blade. One disadvantage is that, although a complete circular cutting edge is defined by two butted blades, the blade cutting edge is not sharp around the entire semi-circle of each blade. That is because it is intrinsic to the manufacturing methods employed to produce the die type blade that flats are present at the end points of the semicircular form, as is clearly depicted in U.S. Pat. No. 4,577,405. The flat areas butt together when the opposed die blades close. Therefore, insulation becomes squeezed between the flats of the two closed blades. The squeezed insulation is left uncut and must be torn away during the subsequent stripping stroke. A second disadvantage of the die type blade is that it has poor ability to gather in the insulated electrical conductor to be cut and stripped compared with the V type blade. This disadvantage is explained in detail in U.S. Pat. No. 4,577,405.

In the industry, there are standard conductor gauge sizes (i.e., 20, 18, 16, 14, 12, 10 AWG) that have closely defined diameters. However, the thickness of the insulation applied to the conductors can vary drastically. For example, an 18 ga./19 stranded conductor (having a diameter of approximately 0.052 inches) can have a thin insulation wall of 0.010 inches, a thick insulation wall of 0.100 inches, or any thickness in between. With the prior die blades of U.S. Pat. Nos. 2,844,056 and 2,871,740, a different pair of blades is required for every combination of conductor/insulation sizes.

A further drawback of prior die blades, as exemplified by the blades of the U.S. Pat. Nos. 2,844,056 and 2,871,740 patents, is that they are very difficult to manufacture with close tolerances. Accordingly, the prior design die blades are very expensive.

My co-pending U.S. Patent Application Ser. No. 051,722 describes an invention that provides the combined features of the sharp radius cutting edge, adjustability, and ability to gather in of the V type blade with the interlocking feature of the die type blade. U.S. Patent Application Ser. No. 051,722 also describes an insulation stop as a means for defining the penetration depth of the sharp blade cutting edge. However, that provision can be incorporated into only one of the blades of a pair.

With the foregoing in mind, there exists a need for a wire processing blade that includes the die type features of accurately controlled penetration of the radius cutting edges of both blades into the insulation to prevent damaging the inner conductor and of a completely circular cutting hole, with the V type blade features of good gathering of the wire and of a sharp cutting edge around an entire circle.

SUMMARY OF THE INVENTION

My present invention encompasses an interlocking tooling assembly for stripping insulated electrical conductors comprising a pair of stripping blades, an insulation guide, and an insulation stop. The invention exhibits several important features. First, a perfectly round cutting hole is formed by mating two semi-circular opposed blade forms together. Second, the semi-circular cutting edges of the respective blades are sharp around their entire peripheries. Third, the cross sections of both stripping blades are U-shaped. The U-shaped cross sections facilitates the addition of a third piece, such as the insulation guide, as a means for interlocking the opposed stripping blades together. A fourth feature is that the insulation guide incorporates a generally V-shape that is specifically sized to suit the insulation outer diameter. The insulation guide functions first to precisely gather in the wire into the blades' semi-circular cutting holes, and secondly to precisely define the depth of penetration of the stripping blade cutting edges into the insulation. The insulation guide is preferably T-shaped in cross section to interfit within the U-shaped stripping blades. A fifth feature of the present invention is that it includes the insulation stop. The insulation stop is T-shaped in cross section, and it interfits with a U-shaped stripping blade. The insulation stop defines the penetration depth of the blade cutting edges. The working end of the insulation stop is contoured to fit within the V-shaped gathering form of the insulation guide.

A major advantage of my invention over prior die type blades is its modular nature. For all practical purposes, the insulation guide and insulation stop are pieces that will not wear out in use. Consequently, only the stripping blades need be replaced when they are worn.

More importantly, with my invention only the insulation guide and insulation stop need be changed to process insulated electrical conductors having different thickness insulation walls but the same conductor gauge size. Conversely, if the outer insulation thickness remains constant and one wishes to process wires having different diameter conductor gauge sizes, only the stripping blades need be changed. Hence, the modular concept greatly simplifies and economizes tooling assembly set up at wire changeover. The ability to interchange stripping blades having different sized cutting holes for the conductor and insulation diameters, and the separability of the perishable stripping blades from the non-wearing insulation guide and insulation stop constitute two major features of the present invention.

Other objects and advantages of the invention will become apparent to those skilled in the art upon reading the disclosure.

BRIEF DESCRIPTION OF THE DRAWINGS

FIG. 1 is a simplified top view of a typical set up using the interlocking die type tooling of the present invention;

FIG. 2 is a partial cross sectional view taken along line 2—2 of FIG. 1, but shown on an enlarged scale;

FIG. 3 is a view similar to FIG. 2, but showing the tooling assemblies in the opened position;

FIG. 3a is a side view of FIG. 3;

FIG. 4 is a cross sectional view taken along lines 4—4 of FIG. 3;

FIG. 5 is a cross sectional view taken along lines 5—5 of FIG. 3;

FIG. 6 is a front view of the long stripping blade;

FIG. 6a is an end view of FIG. 6;

FIG. 7 is a cross sectional view taken along lines 7—7 of FIG. 6;

FIG. 8 is a view taken along lines 8—8 of FIG. 7 and rotated 90° counterclockwise;

FIG. 9 is a front view of the short stripping blade of the present invention;

FIG. 9a is an end view of FIG. 9;

FIG. 10 is a cross sectional view taken along lines 10—10 of FIG. 9;

FIG. 11 is a view taken along lines 11—11 of FIG. 10 and rotated 90° clockwise;

FIG. 12 is a front view of the insulation guide;

FIG. 12a is an end view of FIG. 12;

FIG. 13 is a cross sectional view taken along lines 13—13 of FIG. 12;

FIG. 14 is a front view of the insulation stop of the present invention;

FIG. 14a is an end view of the FIG. 14; and

FIG. 15 is a side view of FIG. 14.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, a cutting station 1 of an insulated electrical conductor cutting and stripping machine 3 is illustrated that includes the present invention. The pertinent portion of the cutting and stripping machine 3 includes a pair of toolholders 5 and 7 that reciprocate relative to each other by known means in the directions of arrow 9. Three sets of wire processing tooling are shown mounted to the toolholders 5 and 7. The central tooling set 13 consists of conventional cutoff blades 15. As the toolholders close toward each other, the opposed cutoff blades 15 bypass each other to cut a desired length from a continuous reel of electrical conductor 17. The other wire processing sets 11 include the tooling assemblies of the present invention. As will be described in detail hereinafter, stripping blades of the processing sets 11 penetrate only the insulation 19 of the electrical conductor 17. The three wire processing sets may be clamped in the toolholders by means of spacers 21 together with set screws 23, as is known in the art.

In accordance with the present invention, each set 11 of wire processing tooling is comprised of a first stripping blade 25, a second stripping blade 27, an insulation guide 29, and an insulation stop 31. Also see FIGS. 2-5. A first stripping blade 25, often called a "long" blade, and an insulation guide 29 are combined to form a first tooling assembly 33 of each wire processing set 11. The long stripping blade and the insulation guide are clamped together in one or the other toolholder 5 or 7. A second stripping blade 27, often called the "short" blade, and an insulation stop 31 are combined to form a second tooling assembly 35 of each wire processing set 11. The second tooling assembly 35 is clamped in the other toolholder opposite the first tooling assembly 33. Tooling assemblies 33 and 35 cooperate to slice and strip insulation 19 from the insulated electrical conductor 17, as will be fully explained.

Now looking at FIGS. 6, 6a, 7, and 8, the long stripping blade 25 will be described. The long stripping blade has a first longitudinally extending planar surface 43. In the preferred embodiment, the first planar surface 43 bounds a base portion 37, and a pair of spaced legs 39 are integrally joined to the base portion 37 to give the long stripping blade a generally U-shaped transverse cross section. The base portion has a planar inside surface 41 that is parallel to the planar surface 43. The base portion inside surface 41 and the facing surfaces 44 of the legs 39 define a groove 45 extending longitudinally along the blade. Preferably, the inside corners of the leg surfaces 44 are machined with respective chamfers 48. The long stripping blade has a back end 46 and a working end 47. The working end 47 is preferably formed with a sloped flat surface 49 that extends between the base portion surfaces 41 and 43. In the construction illustrated, the sloped surface 49 makes an angle A of about 30° with the inside surface 41 and intersects the first planar surface 43 along a sharp straight cutting edge 51. However, if desired, the sloped surface may make an angle A of approximately 30° with the base portion first surface 43 and intersect the base portion inside surface 41 to create the straight cutting edge 51.

In either design, a longitudinally extending depression 53 is formed in the sloped flat surface 49. The depression 53 has a longitudinal axis 55 that preferably is coplanar with the sloped surface. When viewed along the axis 55, as in FIG. 8, the surface of the depression is semi-elliptical in shape. The parameters of the semi-elliptical depression surface are chosen such that the intersection of the depression surface and the base portion first planar surface 43 forms a semi-circular edge 57 of a predetermined radius in the plane of the first surface, FIG. 6. The semi-circular edge 57 is also sharp, and it intersects the straight cutting edge 51. The distance from the straight edge 51 to the stripping blade back end 46 is carefully controlled.

The short stripping blade 27 as shown in FIGS. 9, 9a, 10, and 11 is generally similar to the long stripping blade 25. The short stripping blade has a first longitudinally extending planar surface 63 and a generally U-shaped transverse cross section defined by a base portion 59 and legs 61. The base portion 59 has a second inside planar surface 65. Inside surfaces 67 of the legs 61 cooperate with the base portion inside surface 65 to form a longitudinally extending groove 69. The short stripping blade has a back end 70 and a working end 71. The leg surfaces 67 and the working end 71 are formed with respective chamfers 74 and 76.

The stripping blade working end 71 is formed with a flat surface 73 that slopes between the first planar surface 63 and the base portion inside surface 65. As illustrated, the sloped surface 73 makes an angle A of approximately 30° with the base portion inside surface 65 and intersects the first planar surface in a straight sharp cutting edge 75. As with the long stripping blade 25, the sloped surface 73 may make an angle A with the base portion first surface 63 and intersect the inside surface 65 to form the straight cutting edge 75. However, the surface 73 must slope so as to intersect the surface 63 or 65 that corresponds with the surface 43 or 41, respectively, that intersects the sloped surface 49 of the long stripping blade. A depression 77 having a curved surface 78 is formed in the sloped surface 73. As viewed along the depression axis 79, which is coplanar with the sloped surface 73 (FIG. 11), the contour of the depression surface 78 is semi-elliptical in cross section. The parameters of the semi-elliptical surface are chosen such that the intersection of the depression surface with the stripping blade first planar surface 63 forms a semi-circle 81. The semi-circle 81 is identical to the semi-circle 57 of the long stripping blade 25. The intersection of the semi-circle 81 with the surface 63 is very sharp and forms a radius cutting edge. The radius cutting edge intersects the straight cutting edge 75. Preferably, the distance from the straight edge 75 to the back end 70 is accurately controlled. The major difference between the long and short stripping blades is that the long blade is somewhat longer than the short blade.

Next, the insulation guide 29 will be described. Turning to FIGS. 12, 12a, and 13, the insulation guide preferably has a generally T-shaped transverse cross section with parallel longitudinally extending planar surfaces 82 and 84. A central leg 83 integrally joins to a cross portion 85. The overall width of the cross portion 85 is substantially equal to the width of the base portion 37 of the long stripping blade 25. The leg 83 is dimensioned so as to fit within the groove 45 of the long stripping blade. The insulation guide has a back end 86 and a working end 87. The longitudinal planar surface 82 has chamfers 90, and working end 87 has chamfers 88. The working end 87 is formed with a cutout 89 transversely through the leg 83. The cutout 89 has a generally V-shaped first stage that is bounded by sides 91 that converge toward the back end 86. The cutout also has a second stage in the form of a slot 93 that continues from the first stage sides 91. The particular slot 93 shown terminates in a flat guide face 95, but a curved guide face is also acceptable. The overall length of the insulation guide is preferably longer than the length of the long stripping blade 25. In addition, it is preferred that the dimension from the back end 86 to the guide face 95 be accurately controlled.

Now looking at FIGS. 14, 14a and 15, the insulation stop 31 has a T-shaped transverse cross section with a leg 97 integrally joined to a cross portion 99. The leg 97 has chamfers 98. The insulation stop is dimensioned such that the leg 97 is interfittable in the groove 69 of the short stripping blade 27. The insulation stop has a back end 100 and a working end 101. The insulation stop working end 101 is fabricated with a tab 103 projecting therefrom. The tab is depicted as having tapered sides 105, but parallel sides are also satisfactory. The tab terminates in a stop face 107. Preferably, the overall length of the insulation stop is less than the length of the short stripping blade 27. It is further preferred that the dimension from the insulation stop back end 100 to the stop face 107 be accurately controlled.

The tooling assemblies 33 and 35 of the present invention have been described as comprising stripping blades 25 and 27 having generally U-shaped transverse cross sections, and an insulation guide 29 and an insulation stop 31 having generally T-shaped cross sections. However, stripping blades having T-shaped cross sections and insulation guides and insulation stops having U-shaped cross sections are also within the scope of the present invention, as will be readily recognized by those skilled in the art. Moreover, although it is preferred that the insulation guide and insulation stop do interfit with their respective associated stripping blades, such interfitting is not an absolute requirement of the present invention.

Returning to FIGS. 1-5, the wire processing tooling set 11 of the present invention is used in the following manner. A long stripping blade 25 is chosen that has a diameter of the radius cutting edge 57 appropriate for the particular conductor 109 of the insulated electrical conductor 17 to be stripped. An insulation guide 29 is chosen that is appropriate for the thickness of the insulation 19 of the electrical conductor. The long stripping blade and insulation guide are interfit with each other by placing the leg 83 of the insulation guide into the groove 45 of the long stripping blade. The back ends 46 and 86 of the long stripping blade and the insulation guide, respectively, are aligned. As mentioned, the long blade is shorter than the insulation guide, and the dimensions from their respective back ends 46 and 86 to the cutting edge 51 and guide face 95, respectively, are carefully controlled. The relevant dimensions are such that when the back ends of the long stripping blade and the insulation guide are aligned, a distance D exists between the insulation guide face 95 and the long blade radius cutting edge 57. The distance D is equal to the thickness of the insulation 19 of the particular electrical conductor to be processed. Further, the insulation guide and long stripping blade are dimensioned such that the insulation guide working end 87 extends a predetermined distance X beyond the long stripping blade working end 47. The interfit and aligned long blade and insulation guide form a tooling assembly 33. The tooling assembly 33 is then clamped in a selected toolholder 5 or 7.

Similarly, a short stripping blade 27 is chosen with a cutting edge diameter to suit the inner conductor 109 of the insulated electrical conductor 17 and equal to the diameter of the cutting edge 57 of the long stripping blade 25. An insulation stop 31 suitable for the diameter of the insulation 19 is chosen. The insulation stop and short blade are interfit together by inserting the insulation stop leg 97 into the short stripping blade groove 69. The back ends 70 and 100 of the short blade and insulation stop, respectively, are aligned. The insulation stop and short stripping blade are dimensioned such that when their back ends are aligned, a distance D1 exists between the short blade radius cutting edge 81 and the insulation stop face 107. The distance D1 is equal to the dimension D in tooling assembly 33 and to the thickness of the electrical conductor insulation 19. The insulation stop and short stripping blade are further dimensioned such that when their respective back ends are aligned the short stripping blade working end 71 extends a distance X1 beyond the working end 101 of the insulation stop. The distance X1 is slightly greater than the distance X between the working ends 47 and 87 of the long stripping blade 25 and the insulation guide 29, respectively. The interfit and aligned short blade and insulation stop form a tooling assembly 35. The tooling assembly 35 is clamped to a toolholder 5 or 7 in coplanar alignment with the tooling assembly 33 in the other toolholder.

The insulated electrical conductor 17 to be processed is placed midway between the toolholders 5 and 7. As the toolholders approach each other to the closed position of FIG. 1, the V-shaped first stage of the insulation guide cutout 89 makes first contact with the electrical conductor and gathers it into the second stage of the cutout and toward the cutting edges 51 and 57 of the long stripping blade 25. As the two stripping blade working ends 47 and 71 approach each other, their respective straight cutting edges 51 and 75, together with their radius cutting edges 57 and 81, slice the conductor insulation 19.

In addition, as the two tooling assemblies 33 and 35 approach each other, the leg 83 of the insulation guide 29 near the working end 87 thereof enters the groove 69 of the short stripping blade 27 near its working end 71. As a result, the two tooling assemblies ar interlocked by the distance X when the tool holders 5 and 7 are in the closed position. The chamfers 74 and 76 on the short stripping blade 27 and chamfers 88 and 90 on the insulation guide facilitate the interlocking of those components. Simultaneously, the tab 103 on the insulation stop enters the cutout 89 in the insulation guide. Although it is preferred that the two tooling assemblies do interlock upon closing together, such interlocking is not an absolute requirement of the present invention. Interlocking will not occur if the stripping blades, insulation guide, and insulation stop are formed with cross sectional configurations that do not interfit in a manner similar to the U- and T-shapes illustrated and described.

When the toolholders 5 and 7 reach the closed position of FIG. 1, the working ends 47 and 71 of the respective stripping blades 25 and 27 abut. With the stripping blades in abutting contact, a small clearance C exists between the working end faces 87 and 101 of the insulation guide and insulation stop, respectively. The radius cutting edges 57 and 81 form complementary halves of a complete 360° cutting circle that slices the insulation 19 completely through and that surrounds the inner conductor 109 without contacting it. Simultaneously, the straight cutting edges 51 and 75 slice the outer portions of the insulation beyond the reach of the radius cutting edges. Further, with the toolholders closed to the position of FIG. 1, the distance between the insulation guide guide face 95 and the insulation stop stop face 107 is equal to the diameter of the electrical conductor insulation. In that manner, the two tooling assemblies 33 and 35 can close over an insulated electrical conductor, slice the insulation very accurately through to the inner conductor without harming the conductor, and simultaneously hold the electrical conductor insulation adjacent the slice.

It is a feature of the present invention that the same stripping blades can be used for insulated electrical conductors having different insulation diameters but the same inner conductor diameter. To process wires having different insulation diameters but the same inner conductor diameter, it is necessary only to change the insulation guide 29 and the insulation stop 31 such that the distances D and D1 suit the new insulation thickness. In a similar manner, the same insulation guide and insulation stop can be used with different stripping blades to process wires having the same insulation diameter but different inner conductor diameters. While the cutting edges 51, 57, 75, and 81 of the stripping blades will wear with use, the insulation guide and insulation stop are subjected to very little, if any, wear. The ability to interchange stripping blades having different cutting hole sizes with insulation stops and insulation guides having differently spaced insulation supporting surfaces, thereby separating the perishable stripping blades from the non-wearing insulation guides and insulation stops, is a major advantage of the present invention.

Thus, it is apparent that there has been provided, in accordance with the invention, interlocking die type tooling for stripping insulated electrical conductors that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Interlocking die type tooling for stripping insulated electrical conductors comprising:
   a. a first tooling assembly comprising:
      i. a first stripping blade having first and second parallel longitudinally extending planar surfaces and a working end, the working end being formed with a depression having a surface that intersects a selected longitudinal planar surface in a cutting edge of a predetermined size in the plane of the selected longitudinal planar surface; and
      ii. an insulation guide having a working end, the insulation guide defining a cutout in the working end that terminates in a guide face, the insulation guide and the first stripping blade being relatively positionable to simultaneously enable the insulation guide guide face to be located a predetermined distance from the first stripping blade cutting edge and the insulation guide working end to extend beyond the first stripping blade working end; and
   b. a second tooling assembly comprising:
      i. a second stripping blade having first and second parallel longitudinally extending planar surfaces and a working end, the working end being formed with a depression having a surface that intersects a selected longitudinal planar surface that corresponds to the selected longitudinal planar surface of the first stripping blade in a cutting edge complementary with the first stripping blade cutting edge; and
      ii. an insulation stop having a working end, the insulation stop being formed with a tab projecting from the working end, the tab terminating in a stop face, the second stripping blade and insulation stop being relatively positionable to simultaneously enable the insulation stop stop face to be located a predetermined distance from the second stripping blade cutting edge and the second stripping blade working end to extend beyond the insulation stop working end, the first and second tooling assemblies being aligned with the selected longitudinally extending planar surfaces of the respective first and second stripping blades being coplanar and the insulation guide and insulation stop being coplanar, the tooling assemblies being closable toward each other to enable the working ends of the first and second stripping blades to abut and create an enclosed cutting edge of predetermined size in the plane of the coplanar selected planar surfaces thereof, wherein:
   the first and second stripping blades have respective generally U-shaped transverse cross sections defining longitudinal grooves partially bounded by the respective second longitudinally extending planar surfaces;
   the insulation guide and insulation stop have respective T-shaped transverse cross sections comprised of respective legs;
   the first stripping blade and the insulation guide are relatively positionable by interfitting the insulation guide leg within the first stripping blade groove; and
   the second stripping blade and the insulation stop are relatively positionable by interfitting the insulation stop leg within the second stripping blade groove,
   so that the insulation guide interlocks with the second stripping blade as the first and second tooling assemblies close toward each other.

2. A tooling assembly useful for cutting and stripping insulation from an insulated electrical conductor comprising:
   a. a stripping blade having first and second parallel longitudinal planar surfaces and a working end, the working end being formed with a depression having a surface that intersects a selected longitudinal planar surface in a cutting edge of a predetermined size in the plane of the selected longitudinal surface, wherein the stripping blade has a generally U-shaped transverse cross section defining a longitudinal groove partially bounded by the second longitudinal planar surface; and
   b. an insulation guide having a working end, the insulation guide defining a cutout in the working end that terminates in a guide face, the insulation guide and first stripping blade being relatively positionable to simultaneously enable the insulation guide guide face to be located a predetermined distance from the stripping blade cutting edge and the insulation guide working end to extend beyond the stripping blade working end, wherein:
      i. the insulation guide has a generally T-shaped transverse cross section comprised of a leg; and
      ii. the stripping blade and the insulation guide are relatively positionable by interfitting the insulation guide leg within the stripping blade groove.

3. A tooling assembly useful for cutting and stripping insulation from an insulated electrical conductor comprising:
   a. a stripping blade having first and second parallel longitudinal planar surfaces and a working end, the working end being formed with a depression having a surface that intersects a selected longitudinal planar surface in a cutting edge of predetermined size in the plane of the selected longitudinal planar surface, wherein the stripping blade has a generally U-shaped transverse cross section defining a longitudinal groove partially bounded by the second longitudinal planar surface; and b. an insulation stop having a working end with a tab projecting from the working end, the tab terminating in a stop face, the stripping blade and insulation stop being relatively positionable to simultaneously enable the insulation stop stop face to be located a predetermined distance from the stripping blade cutting edge and the stripping blade working edge to extend beyond the insulation stop working end, wherein:
  i. the insulation stop has a generally T-shaped transverse cross section comprised of a leg; and
  ii. the stripping blade and the insulation stop are relatively positionable by interfitting the insulation stop leg within the stripping blade groove.

4. A stripping blade having a predetermined length and first and second longitudinal planar surfaces and a working end extending therebetween, the working end having a generally flat sloped surface extending between the first and second longitudinal surfaces, the sloped surface intersecting a selected longitudinal planar surface to form a straight cutting edge, a depression being formed in the sloped surface, the depression having a surface that intersects the selected longitudinal planar surface and the straight cutting edge in a curved cutting edge, wherein the stripping blade has a generally U-shaped transverse cross section extending the full length thereof with a base portion and opposed legs joined thereto, the base portion being bounded by the first and second planar surfaces, and the sloped surface being formed solely in the base portion and lying between the opposed legs, the base portion first planar surface and the opposed legs defining a longitudinal groove.

5. An insulation guide assemblable with a selected stripping blade to create a tooling assembly useful for processing insulated electrical conductors comprising first and second longitudinal planar surfaces and a back end and a working end with a predetermined length between the back end and the working end, the working end being formed with a cutout having a generally V-shaped first stage with sides that converge toward the back end, and a second stage that has sides that intersect the converging sides of the first stage and that extend toward the back end, the cutout second stage terminating in a guide face extending between the first and second planar surfaces, wherein the insulation guide has a generally T-shaped transverse cross section with a leg that extends for the full length of the insulation guide, so that the insulated electrical conductor can be gathered by the cutout first stage toward the second stage guide face and the insulation guide leg may be interfit with a full length groove in the selected stripping blade to prevent relative transverse motion between the insulation guide and the selected stripping blade.

6. An insulation stop assemblable with a selected stripping blade to create a tooling assembly useful for processing insulated electrical conductors comprising first and second parallel longitudinal planar surfaces and a back end and a working end and having a predetermined length between the back end and the working end, the working end being formed with a tab projecting therefrom, the tab terminating in a stop face extending between the longitudinal planar surfaces, wherein the insulation stop has a generally T-shaped transverse cross section with a leg that extends from the full length of the insulation stop, so that the insulation stop leg may be interfit with a full length groove in the selected stripping blade to prevent relative transverse motion between the insulation stop and the selected stripping blade.

7. In a machine for processing insulated electrical conductors and having first and second toolholders; and means for reciprocating the toolholders in continuous cycles toward and away from each other to create closed and opened toolholder positions, respectively, apparatus for cutting and stripping the insulation from the electrical conductors comprising:

a. a first stripping blade clamped to the machine first toolholder, the first stripping blade having first and second parallel longitudinal planar surfaces, a back end and a working end, the back end being clamped in the first toolholder, the working end being formed with a depression having a surface that intersects a selected longitudinal planar surface in a cutting edge of predetermined size in the plane of the selected longitudinal planar surface;

b. a second stripping blade clamped in the machine second toolholder and substantially coplanar with the first stripping blade, the second stripping blade having first and second parallel longitudinal planar surfaces, a back end and a working end, the back end being clamped in the second toolholder, the working end being formed with a depression having a surface that intersects a selected longitudinal planar surface that corresponds to the selected longitudinal planar surface of the first stripping blade in a cutting edge that is complementary with the cutting edge of the first stripping blade;

c. an insulation guide clamped in the first toolholder and having a working end extending beyond the first stripping blade working end for contacting the insulated electrical conductor when the toolholders are in the closed position; and d. an insulation stop clamped in the second toolholder, said insulation stop having a working end for contacting the insulated electrical conductor when the toolholders are in the closed position, the second stripping blade working end extending beyond the insulation stop working end, wherein:
  i. the first and second stripping blades have respective generally U-shaped transverse cross sections defining longitudinal grooves partially bounded by the respective second longitudinally extending planar surfaces;
  ii. the insulation guide and insulation stop have respective T-shaped transverse cross sections comprised of respective legs;
  iii. the first stripping blade and insulation guide are relatively positionable by interfitting the insulation guide leg within the first stripping blade groove; and
  iv. the second stripping blade and insulation stop are relatively positionable by interfitting the insulation stop leg within the second stripping blade groove, so that when the toolholders are in the closed position the insulation guide interlocks with the second stripping blade and the cutting edges of the first and second stripping blades cooperate to slice the insulation of the insulated electrical conductor and the insulation guide and the insulation stop cooperate to hold the insulation of the electrical conductor adjacent the slice.

8. In a machine for processing insulated electrical conductors and having first and second toolholders; and means for reciprocating the toolholders in continuous cycles toward and away from each other to create closed and opened toolholder positions, respectively, apparatus for cutting and stripping the insulation from the electrical conductors comprising:

a. a first stripping blade clamped to the machine first toolholder, the first stripping blade having first and second parallel longitudinal planar surfaces and a back end and a working end, the back end being clamped in the first toolholder, the working end being formed with a depression having a surface that intersects a selected longitudinal planar surface in a cutting edge of predetermined size in the plane of the selected longitudinal planar surface;

b. a second stripping blade clamped in the machine second toolholder and substantially coplanar with the first stripping blade, the second stripping blade having first and second parallel longitudinal planar surfaces and a back end and a working end, the back end being clamped in the second toolholder, the working end being formed with a depression having a surface that intersects a selected longitudinal planar surface that corresponds to the selected longitudinal planar surface of the first stripping blade in a cutting edge that is complementary with the cutting edge of the first stripping blade;

c. guide means clamped in the first toolholder for contacting the insulated electrical conductor when the toolholders are in the closed position, wherein the guide means comprises an insulation guide having a back end clamped in the first tool holder adjacent the first stripping blade and having a working end that defines a guide face located at a predetermined distance from the cutting edge of the first stripping blade; and d. stop means clamped in the second tool holder for contacting the insulated electrical conductor when the toolholders are in the closed position, wherein the stop means comprises an insulation stop having a back end clamped in the second tool holder and a working end, the insulation stop being coplanar with the insulation guide, the working end being formed with the stop face located at a predetermined distance from the second stripping blade cutting edge that cooperates with the insulation guide guide face to hold the insulated electrical conductor therebetween when the toolholders are in the closed position, wherein:

i. each of the first and second stripping blades has a generally U-shaped transverse cross section defining a longitudinal groove partially bounded by the second longitudinal planar surface;

ii. each of the insulation guide and insulation stop has a generally T-shaped transverse section comprised of a leg;

iii. the insulation guide leg interfits within the first stripping blade groove; and iv. the insulation stop leg interfits within the second stripping blade groove, so that when the toolholders are in the closed position the cutting edges of the first and second stripping blades cooperate to slice the insulation of the insulated electrical conductor and the guide means and the stop means cooperate to hold the insulation of the electrical conductor adjacent the slice.

9. The machine of claim 8 wherein the working end of the insulation guide extends beyond the working end of the first stripping blade, and wherein the working end of the second stripping blade extends beyond the working end of the insulation stop, so that the insulation guide interlocks with the second stripping blade as the first and second toolholders close toward each other.

* * * * *